United States Patent [19]

Hauge

[11] Patent Number: 4,773,003

[45] Date of Patent: Sep. 20, 1988

[54] APPARATUS FOR MONITORING AND ANALYZING LARGE DATA BLOCKS ON A COMPUTER CHANNEL

[75] Inventor: Trygve A. Hauge, Wayzata, Minn.

[73] Assignee: Technology 80, Inc., Golden Valley, Minn.

[21] Appl. No.: 788,394

[22] Filed: Oct. 17, 1985

[51] Int. Cl.[4] ............................................. G06F 11/34
[52] U.S. Cl. ............................................. 364/200
[58] Field of Search ............... 364/178, 200 MS File, 364/ 900 MS File

[56] References Cited

U.S. PATENT DOCUMENTS

| | | | |
|---|---|---|---|
| 3,976,981 | 8/1976 | Bowden | 364/200 |
| 4,040,025 | 8/1977 | Morrill, Jr. et al. | 364/900 |
| 4,041,461 | 8/1977 | Kratz et al. | 364/200 |
| 4,322,846 | 3/1982 | Carroll et al. | 364/200 X |
| 4,367,525 | 1/1983 | Brown et al. | 364/200 |
| 4,477,873 | 10/1984 | McCarley | 364/200 |
| 4,494,190 | 1/1985 | Peters | 364/200 |
| 4,564,899 | 1/1986 | Holly et al. | 364/200 |
| 4,682,284 | 7/1987 | Schrofer | 364/200 |

Primary Examiner—Raulfe B. Zache
Assistant Examiner—Danh T. Phung
Attorney, Agent, or Firm—Paul L. Sjoquist

[57] ABSTRACT

A channel analyzer system has circuits for passive coupling to individual signal lines on a computer data channel, and for monitoring the data passed thereover, with logic circuits having preselectable capability for recognizing transmitted data of interest for further analysis. The system further includes a large storage capability for retaining preselected amounts of data, examining blocks of data so collected and recorded, labeling data samples with an identifier; displaying selected portions of the samples, including representative values signifying the data content and preselected signal line changes of interest, data channel activity prior to and subsequent to the preselected signal line event which is of interest; and displaying the same for providing a visualized summary of activity of a computer channel according to the protocols defined for the channel activity.

17 Claims, 6 Drawing Sheets

| SAMPLE NUMBER | BUS OUT VALUE | BUS IN VALUE | EXTERNAL SIGNALS | CHANGES | TRUE TAGS |
|---|---|---|---|---|---|
| 723 | 00 | 00 | 1 | | OPO,HLO,SLO,SVI,OPI |
| 724 | 00 | 00 | 1 | CDO | CDO,OPO,HLO,SLO,SVI,OPI |
| 725 | 00 | 00 | 0 | /SVI | CDO,OPO,HLO,SLO,OPI |
| 726 | 00 | 00 | 0 | /CDO | OPO,HLO,SLO,OPI |
| 727 | 00 | 02 | 1 | STI | OPO,HLO,SLO,STI,OPI |
| 728 | 00 | 02 | 0 | /HLO | OPO,SLO,STI,OPI |
| 729 | 00 | 00 | 1 | /SLO | OPO,STI,OPI |
| 730 | 21 | 00 | 0 | SVO | SVO,OPO,STI,OPI |
| 731 | 21 | 00 | 1 | /OPI | SVO,OPO,STI |
| 732 | 21 | 00 | 1 | /STI | SVO,OPO |
| 733 | 00 | 00 | 0 | /SVO | OPO |
| 734 | 01 | 00 | 0 | ADO | ADO,OPO |
| 735 | 01 | 00 | | HLO | ADO,OPO,HLO |
| 736 | 01 | 00 | | SLO | ADO,OPO,HLO,SLO |
| 737 | 01 | 00 | | OPI | ADO,OPO,HLO,SLO,OPI |
| 738 | 00 | 00 | | /ADO | OPO,HLO,SLO,OPI |
| 739 | 00 | 01 | | ADI | OPO,HLO,SLO,OPI,ADI |
| 740 | 00 | 01 | | CDO | OPO,HLO,SLO,OPI,ADI,CDO |
| 741 | 00 | 00 | | /ADI | OPO,HLO,SLO,OPI,CDO |

*Fig. 7*

APPARATUS FOR MONITORING AND ANALYZING LARGE DATA BLOCKS ON A COMPUTER CHANNEL

BACKGROUND OF THE INVENTION

The present invention relates to a monitor and analyzer for digital communications channel activity, and more particularly to a monitor and analyzer for passive interconnection to a computer data channel or the like, for providing a visualization for operator analysis of data channel activity.

In the field of hardware and software diagnostic evaluation of computer signals it has been necessary to develop hardware systems and methods of analysis which are based on less than totally comprehensive system operating parameters. It is technically impractical, if not impossible, to fully monitor and analyze all signal state changes which occur in any realistically sized computer system at the real-time rates of change which such signals undergo. The sheer quantity of possible signals which exist within and without a computer system limits the practicality of designing and operating a total system monitor, for in this case the complexity of the monitor exceeds that of the computer being monitored. Selective monitoring of particular computer circuits represents a feasible design problem, particularly where the circuits selected for monitoring are conveying data signals of particular interest, and which are particularly useful in measuring successful operation of the system. For this reason, signal lines associated with computer data channels may preferably be selected as monitor points, for these signal lines are generally associated with the useful data which the computer is either processing or transmitting during any given operation.

Monitoring signal lines representative of computer data channel activity presents further problems, however, for data transmission rates over these lines often occur at millions of transitions per second. Therefore, a hardware or software monitoring system must be capable of responding to signal changes at these high data transmission rates, and if the data is to be collected for useful analysis such systems must be capable of storing the information as it is transmitted at these rates. This leads to the further problem of providing sufficient storage for receiving and accumulating large quantities of data, at rates of speed which coincide with the data transmission rates over the data channels. This problem is technically impractical or impossible of solution if more than a few seconds of computer data channel activity is to be collected, for the volume of storage which must be made available for such collection becomes extremely large if any significant data accumulation is desired. Further, even if a sufficient storage volume is provided for collecting significant amounts of data from a computer data channel, the amount of time required for analysis of such data is invariably longer than the time required to transmit the data. Therefore, analysis of bulk quantities of data is usually accomplished offline, at nonreal-time rates, frequently in a post-processing computer which is configured exclusively for analysis of such volumes of data.

If real-time monitoring and analysis is desired it is usually required that sampling techniques be employed, wherein random or preselected samples of data are captured from a data channel and are analyzed in real time, utilizing an analysis scheme which has some statistical validity for predicting the existence or nonexistence of particular events being monitored. Such sampling techniques can be triggered by predetermined signal events within a computer, as for example by initiating a sampling interval at the time a data output channel is activated, and continuing the sampling interval until such time as the data output channel is deactivated. The statistical samples so collected are presumed to be representative of the actual real-time data channel activity, and diagnostic and other assumptions are made from observations made of the data so collected. Data monitoring and analysis can also be predicated by an event trigger which causes a brief period of collection to occur wherein all data channel activity is retrieved and stored for a brief time interval after the event of significance has been detected. Such a technique might be utilized wherein a fault indication signal line is monitored, and the occurrence of a signal on this line causes a plurality of data channel lines to become monitored, and the signals thereon collected and stored, and an analysis of the data so collected be undertaken in order to attempt to ascertain the cause of the fault indication. It is possible to utilize this technique in real-time conditions if the volume of data collected is sufficiently small so as to permit the analysis circuits to complete their operation before further and additional data is transmitted requiring the same analysis.

Even the last above-described technique is not useful when the cause of the fault detection signal is derived from conditions which occurred on the data channel prior to the occurrence of the fault signal. In this case, it is of no help to collect quantities of data after the fault signal for the condition which led to the fault signal has already passed and the contents of the data channel which might suggest the cause of the fault have not been recorded.

There is a need for a data channel analyzer, and a method for analysis of data transmitted over data channels which provides for the monitoring of data channel activity and for the detection of preselected signal conditions requiring analysis, and for the accumulation of a predetermined volume of channel data occurring before and after the preselected conditions for inclusion in the analysis activity. Further, there is a need for a monitoring system and technique which permits the real-time monitoring and analysis of the data transmitted over a data channel. Finally, there is a need for a system of data channel monitoring and analysis which provides an intelligible display and summary of the results of the monitoring and analysis for convenient and understandable presentation to an operator.

SUMMARY OF THE INVENTION

A method and apparatus for passively monitoring the data channel signal lines of a computer system and the like, including logic circuits for recognizing predetermined events of interest, and collecting and storing a predetermined volume of past and subsequent data in time relationship to the detected event of interest, and circuits for examining the collected quantity of data and for labeling the collected sample with predetermined identifiers and displaying the identifiers in association with intelligible values representative of the data, including the event which caused the data sample to be taken, thereby to enable an operator to visualize the activity of a computer channel according to the protocol defined for the channel activity.

It is a principal object of the present invention to provide an apparatus for enabling operator visualization of computer data channel activity, particularly with reference to predetermined events occurring on the data channel.

It is a further object of the present invention to provide an apparatus for passively monitoring the signal activity on a data channel, and for analyzing the signal activity to detect signal events of predetermined interest, and for recording data transmissions occurring prior to and subsequent to the event of interest.

It is another object of the present invention to provide an apparatus for monitoring data channel activity, and for analyzing such activity according to a predetermined analysis technique, and for presenting a summary display for operator visualization of the results of such monitoring and analysis.

BRIEF DESCRIPTION OF THE DRAWINGS

The foregoing objects and advantages will become apparent from the following specification and claims, and with reference to the appended drawings, in which:

DESCRIPTION OF THE PREFERRED EMBODIMENT

Figure 1:
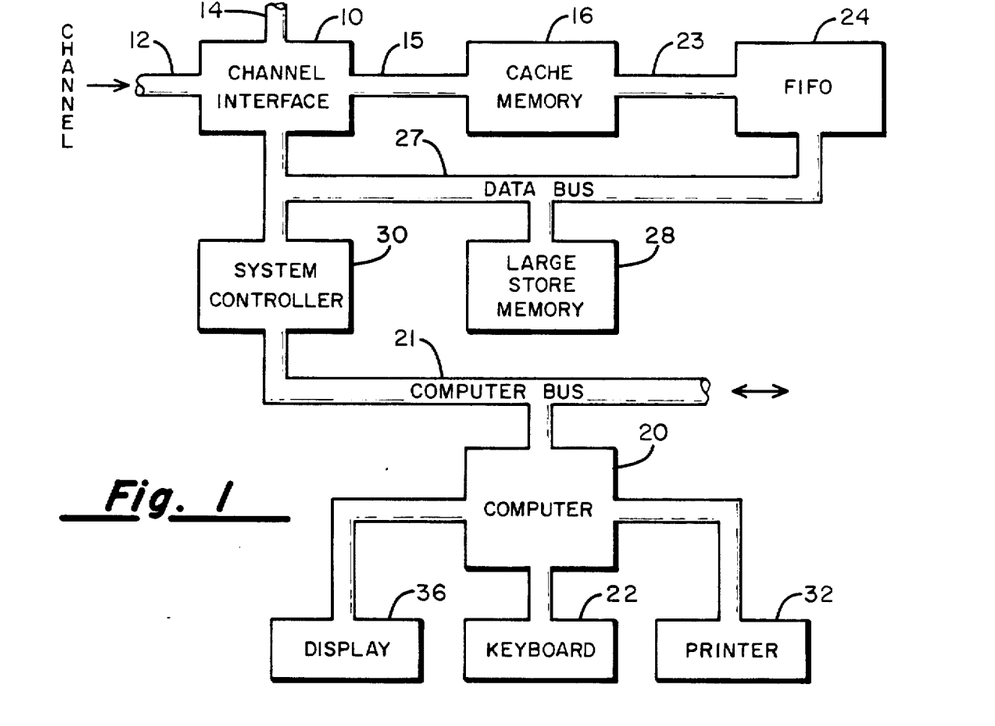
FIG. 1 shows a functional block diagram of the invention.

Referring first to FIG. 1 there is shown a functional block diagram of the invention; illustrating the various paths where parallel data transmission occurs, but showing none of the associated control signal lines. A channel interface 10 is designed to receive input signals from a computer data channel or similar data bus of the type having a plurality of information bits transmitted over parallel lines. Channel interface 10 is connected to the individual signal lines via a plurality of input lines 12, which are connected to the data channel lines associated with signals which it is desirable to monitor. The total number of these signal lines may vary, but one form of the preferred embodiment is capable of monitoring thirty-five individual channel lines. Channel interface 10 also has a secondary set of input lines 14 which are adapted for connections similar to input lines 12. Input lines 14 are adapted to receive user selectable input signals, which signals may be derived from signal points of interest in the equipment being monitored. The preferred embodiment utilizes ten user selectable lines 14, and lines 14 may optionally be configured for interconnection to other channel signals or to other signals within any particular piece of equipment of interest. For example, one of the user selectable lines 14 may be connected to a clock signal associated with the equipment being monitored, or to a real time clock signal. Channel interface 10 also includes a set of data bus input lines from data bus 27. These input lines originate in system controller 30, and typically may be an 8-bit or 16-bit data bus of the type commonly used with computer equipment. The information received by channel interface 10 via these data bus lines generally originates within computer 20, is transmitted over computer bus 21 to system controller 30, and is further transmitted over data bus 27 to channel interface 10. The information present on these data bus lines frequently originates as a command entered by the operator through the operator keyboard 22, as will hereinafter be more fully described.

Signal lines which are monitored by channel interface 10 may be selectively transferred into a cache memory 16 via a data bus 15. Cache memory 16 is a high-speed memory which is capable of receiving and storing data samples at high data rates. In the preferred embodiment cache memory 16 is designed to have a capacity of at least 1,000 45-bit words, although the cache memory 16 may be readily expanded either in terms of the number of bits which it is capable of storing or in terms of the number of words which it is capable of storing. Cache memory 16 can receive and store samples at a maximum rate of approximately 12 megahertz (Mz).

Cache memory 16 is connected to a first in, first out (FIFO) memory and control 24 via a data bus 23. FIFO 24 receives data samples from cache memory 16, and contains circuitry for making a determination whether the data samples are to be retained or discarded. If the determination is made that the data samples are to be discarded, FIFO 24 merely clears its internal data registers where the samples are stored. If it is determined that the data samples are to be retained FIFO 24 transfers the data samples to a large store memory 28 via the data bus 27. In the preferred embodiment FIFO 24 is designed to have a data handling rate of at least 5 megahertz, and is capable of transferring data to the large store memory 28 at data storage rates in the range of 2-3 megahertz.

Large store memory 28 is controlled by a system controller 30, which controls and initiates the read/write memory cycles necessary to operate large store memory 28. System controller 30 is in turn controlled either by circuitry within FIFO 24 or by circuitry within computer 20, depending upon whether the system is operating in a data sampling mode or in a data display mode. Large store memory 28 may be designed with a memory capacity in the range of 32K-512K words of 48 bits each. The data stored in this memory is available to computer 20 via system controller 30, or optionally may be transferred via data bus 27 to a high-speed tape storage unit (not shown).

Computer 20 is utilized to maintain command and control of the entire system via computer bus 21 and other input and output control signal lines associated with computer 20. Computer 20 may be a commercially available computer type such as a Model MC85 Single Board Computer, available from Comark Corporation, Medfield, Massachusetts, which has been adapted for use in connection with the invention. Since computer 20 is a general purpose computer system, it is capable of internal storage of operating programs, and interconnection to any of a wide variety of commercially available devices conventionally adapted for such connection. For example, computer 20 is associated with a standard commercially available keyboard 22 and a commercially available printer 32. A commercially available cathode ray tube (CRT) display 36 may also be connected to computer 20 in a manner which is well known in the art. Computer 20 has a standard RS232 external interface connection which is adaptable and compatible with many commercially available devices. It is contemplated that computer 20 may be connected via this RS232 connection to standard telecommunications modems or other similar devices, to permit command and control of the invention to be transferred to a remote location via the telecommunications network.

The invention operates as an independent data logger, which is driven by transitional clocking, i.e., the change of state of signals which are either negative-going signals or positive-going signals, wherein such signals are connected to channel interface 10. The operation and handling of such signals is under the control of preset conditions which are initially entered into computer 20 by an operator, which will be more fully explained hereinafter. Once the preset conditions have been entered the logging and monitoring functions of the invention continue uninterrupted until the preset conditions determine the cessation of sampling and logging. The preset conditions may permit sampling operations to continue uninterrupted for extended periods of time, extending even to several weeks of operation. Obviously, the amount of data collected over an extended period of time may be far beyond the storage capacity of large store memory 28, and in such event the system is designed to store newly acquired data over old data contained in large store memory 28 after it has become completely filled.

For operator convenience computer 20 has an internal operating program which is designed to present to the operator a menu-driven sequence of selection choices. This enables the operator to fashion a monitor or test run which yields great flexibility in specifying the conditions for monitoring and stopping the system. For example, the operator may elect not to sample all activity on the monitored channel, but to sample merely those channel activities which relate to predetermined equipment of interest. By limiting the sampling to only certain equipment of interest activities, it is apparent that the large store memory 28 may collect and store a considerable volume of data related to this equipment. Of course, through the use of high-speed tape storage equipment the operator may choose to acquire and retain data from numerous monitoring runs, resulting in extremely large volumes of data for later analysis.

Channel Interface

Channel interface 10 provides the interconnecting lines for attachment to other computer input and output channels, including signal lines which may be attached to other computer signal generating points of interest. The channel interface input lines into channel interface 10 may be directly coupled to cables and other connectors of remote equipment, a feature of the invention being that it presents a passive electrical interface which does not interfere with the regular data transmission capabilities of the equipment being monitored.

Figure 2A:
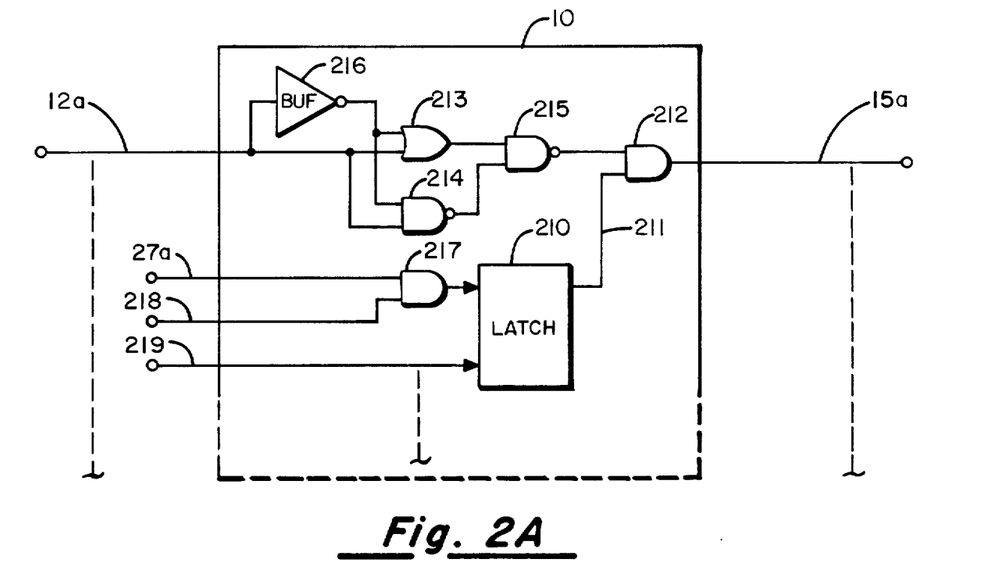
FIG. 2A shows a schematic logic diagram of the channel interface circuits.

Referring next to FIG. 2A, there is shown a schematic logic diagram of a single signal interface circuit. A plurality of such circuits may be found within channel interface 10, the circuit illustrated being representative of all such circuits. The circuit of FIG. 2A is connected to an input line 12a, which is one of the input signal lines associated with a group of input lines 12. In the preferred embodiment thirty-four such lines are contemplated, although a greater or lesser number may readily be selected. The interface circuit also has an output signal line 15a associated therewith, line 15a being one of a plurality of lines associated with data bus 15. When the signal on line 12a is at a steady state voltage level the output signal on line 15a is at a constant level, which will herein be defined as "low". For purposes of clarity, signals will be referred to as being either "high" or "low", to indicate the relative logic levels of the signal voltage states. It is to be understood that this reference is for purposes of understanding the invention, and any of a wide variety of circuits capable of operating under various voltage operating conditions are possible for use with the invention.

When the input signal on line 12a changes state in either direction a positive pulse appears on output line 15a if the enable latch flip-flop 210 is in the "set" condition. The "set" output of latch flip-flop 210 is connected via line 211 to AND gate 212. When the input signal on line 12a is a steady state low value the output of BUF circuit 216 is high, which is coupled to an input of OR circuit 213. This causes the output of OR circuit 213 to be high, and the output of NAND circuit 214 is also high. These signals are fed as inputs to NAND circuit 215, which therefore has a low output signal. This signal is connected to AND gate 212, resulting in a low output signal on line 15a.

BUF circuit 216 is a signal inversion circuit having a relatively slow response time compared to the other circuits in channel interface 10. The steady state output signal from BUF circuit 216 is high, but the second input into NAND gate 214 is low, thereby providing a steady state output signal from NAND gate 214 which is high. When the input signal on line 12a suddenly transitions from low to high the output of NAND gate 214 immediately goes low, and the output signal of NAND gate 215 follows by going high. This output signal is transferred through AND gate 212 to appear at output line 15a as a high signal. A very short time later, corresponding to the response time of BUF circuit 216, the output of BUF circuit 216 goes low, thereby causing the output of NAND gate 214 to again go high. This output signal causes NAND gate 215 to again go low, resulting in the signal on output line 15a going low. In this manner, a signal transition on input line 12a from low to high causes an output signal to briefly appear on line 15a. This operation presumes that latch circuit 210 is in the "set" state, having a high signal on line 211.

A similar result occurs during a signal state change on input line 12a from high to low, for under this condition a brief high signal will also appear on output line 15a. The time duration of the high output signal on line 15a is a function of the switch delay time of BUF circuit 216, which typically is selected to respond in 10-30 nanoseconds. BUF circuit 216 is a commercially available circuit, such as a type SN75127 line receiver available from Texas Instruments, Inc., and all of the circuits shown in FIG. 2A are commercially available logic circuits.

The latch flip-flop 210 is controllable by signals originating in computer 20, some of which are conveyed over computer bus 21 via system controller 30 to data bus 27. Input signal line 27a, which represents one signal line of the data bus 27, is coupled to an AND gate 217. A second signal line 218 is also coupled to AND gate 217, and the signal on line 218 is a computer-generated enable signal which causes latch flip-flop 210 to become set whenever line 27a is high. An input signal on line 219 is also computer generated to cause latch flip-flop 210 to become reset or disabled. Each of the channel interface circuits in channel interface 10 include the foregoing circuitry, and computer 20 is therefore able to selectively activate various channel data bits for monitoring by first sending a preselected data word over computer bus 21 to system controller 30, which in turn selectively signals lines 27a-27n, followed immediately by a latch enable signal over line 218, which line 218 is connected to all channel interface circuits. Similarly, line 219 is connected to all channel interface circuits so that the respective latch enable flip-flops 210, etc. are simultaneously disabled by the activation of a single computer 20 output signal.

Figure 2B:
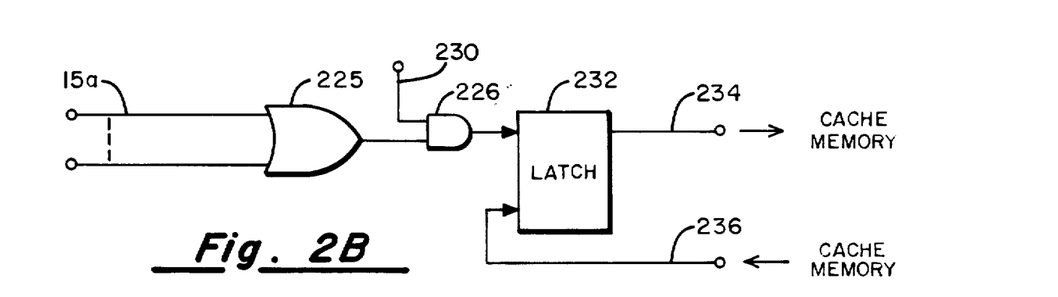
FIG. 2B shows a logic diagram of control circuits associated with the channel interface.

FIG. 2B shows the control circuits for gating the output signals from the channel interface circuits into the cache memory 16. Each of the channel interface output signal lines 15a, 15b, . . . 15n are connected into an OR gate 225. The output of OR gate 225 is connected to an AND gate 226, which AND gate has a further signal input line 230. Signal line 230 receives a "sampling enable" signal, which permits the output of OR gate 225 to set a latch flip-flop 232. Output line 234, which is denoted the "sample ready" signal line, is connected to a control circuit in cache memory 16, to initiate a cache memory data input sequence. At the completion of the data input sequence into cache memory 16 a control signal is transferred from cache memory 16 back to flip-flop 232 via line 236, to disable the "sample ready" signal line.

Figure 2C:
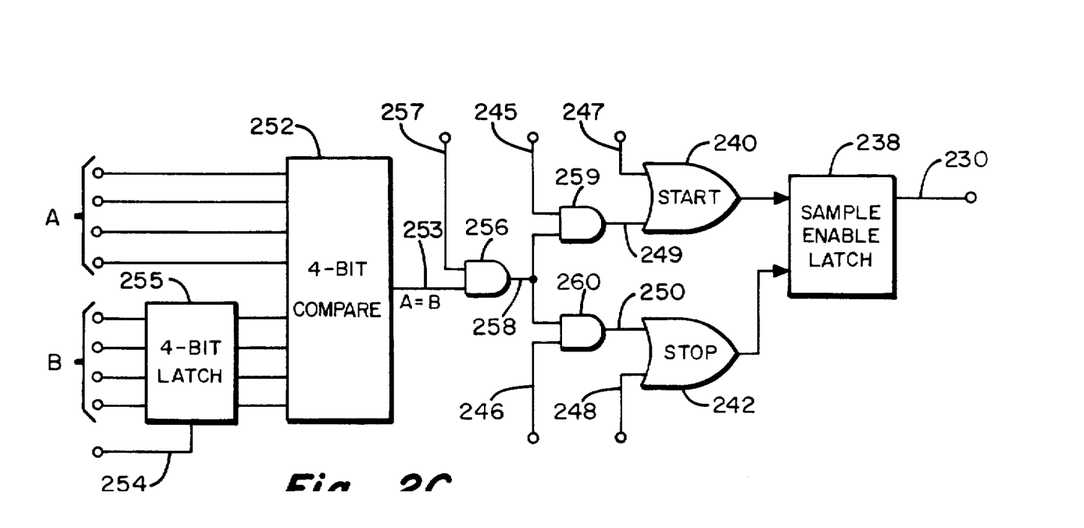
FIG. 2C shows a logic diagram of the sampling enable control circuits associated with the channel interface.

Referring next to FIG. 2C, there is shown a schematic logic diagram of the sampling enable circuits. These circuits determine the conditions under which the cache memory 16 is activated to accept samples from the channel interface 10, by controlling the input enable signal to AND gate 226 (FIG. 2B) via signal line 230. Signal line 230 goes high whenever sample enable latch 238 becomes set. Signal line 230 goes low whenever sample enable latch becomes reset. Sample enable latch 238 becomes set by a number of signals which may be coupled into OR gate 240, which is designated "start sample" OR gate 240. Sample enable latch 238 becomes reset by a number of signals which are fed into OR gate 242, which is designated "stop sample" OR gate 242. Among the conditions which cause a sampling enable to be generated by signal line 230 are an external start signal over line 258, or a computer start signal over line 247. Additional start conditions (not shown) may also be fed into OR gate 240 to control the setting of sample enable latch 238, and thus cause sample data to be input. Similarly, among the signals which cause deactivation of the sampling enable signal on line 230 are an external stop signal over line 258, or a computer stop signal over line 248. Additional stop conditions (not shown) may also be fed into stop OR gate 242, especially signals from condition check logic 424 in FIFO and control 24 (FIG. 4), to control the reset of sample enable latch 238 and thus cause cessation of sampling. The external start and stop signals are generated by external wiring, i.e., by connecting lines A to appropriate external signal generating events which can control the beginning and end of a sampling interval. The computer start and stop signal lines 247 and 248 are controlled by computer 20, through the data signals transferred over computer bus 21 via system controller 30 and data bus 27. These signals are generated under computer 20 control, usually as a function of operator-entered input data.

The output of AND gate 256 is determined by a 4-bit comparator 252. Comparator 252 receives two groups of four input lines, and output line 253 of comparator 252 goes high whenever a match is made between the respective 4-bit data quantities, which are respectively designated "A" and "B" in FIG. 2C. The 4-bit quantity designated "A" may be derived over signal lines which are externally connected to signal generating sources of interest. The 4-bit quantity designated "B" is generated over signal lines which are derived from computer 20, via computer bus 21, system controller 30 and data bus 27. Computer 20 generates the 4-bit quantity "B", and subsequently generates a latch enable signal over line 254 to cause this 4-bit quantity to become stored in a 4-bit latch register 255. Latch register 255 holds this information in constant comparison with the 4-bit external quantity "A", and whenever a match is found the comparator 252 will generate a signal on line 253. The signal on line 253 passes into AND gate 256, which is also conditioned by an enable signal on line 257. The presence of both these signals causes AND gate 256 to generate an output signal over line 258 which is received by AND gates 259 and 260. AND gate 259 is further conditioned by an external start enable signal over line 245, and the presence of this signal causes start OR gate 240 to set sample enable latch 238 and generate a sampling enable signal over line 230. The signal output on line 258 also appears at AND gate 260, which is also conditioned by an external stop enable signal over line 246, the presence of both causing stop sample OR gate 242 to generate a signal which resets sample enable latch 238 and removes the sampling enable signal at line 230. As described hereinbefore, the sampling enable signal at line 230 provides the signal for causing the cache memory 16 to begin storing data samples transmitted over data bus 15. These data samples are derived from signal state changes detected on the respective input lines 12.

Cache Memory and Control

Figure 3:
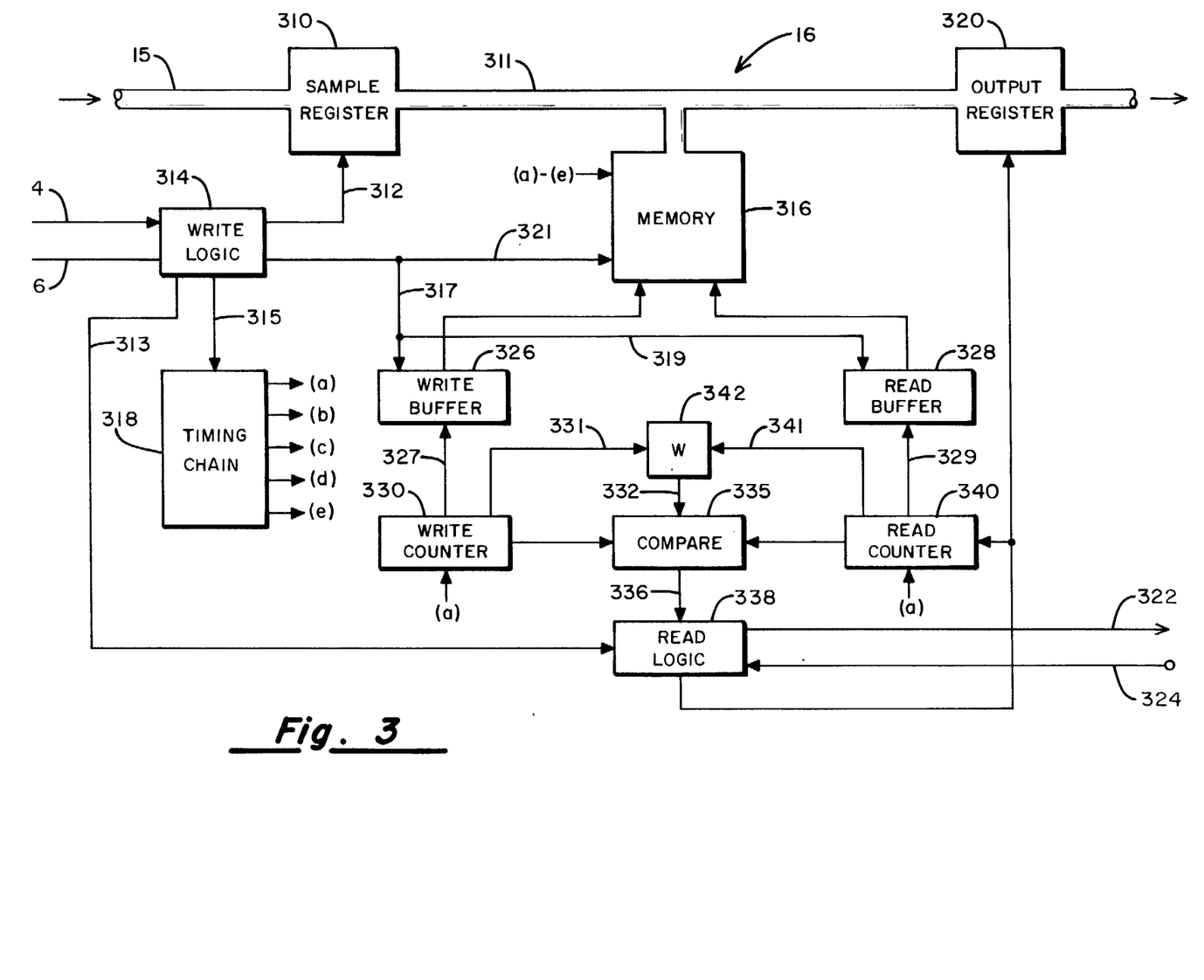
FIG. 3 shows a functional block diagram of the cache memory and control.

Referring next to FIG. 3, there is shown a functional block diagram of cache memory and control 16. Cache memory and control 16 includes a sample register 310 which is connected to data bus 15, to receive and hold data samples transmitted over data bus 15. Sample register 310 is activated by a signal over line 312, from write logic 314. Write logic 314 essentially contains latch circuits for receiving "sample ready" signals over line 234 (FIG. 2B), and for activating a memory storage cycle in memory 316, and for initiating a timing sequence in timing chain 318. Further, write logic 314 functions to determine whether memory 316 is in an active or inactive status, and whether it is able to receive further information over memory bus 311. Finally, write logic 314 generates a "disable" signal over line 236 to complete the transfer sequence of a data sample into sample register 310.

As indicated hereinbefore, cache memory 16 contains a small, high speed memory 316 which is capable of storing at least 1,000 45-bit words before reaching its storage capacity. Of course, it is possible to expand memory 316 beyond this storage limitation, depending upon the particular data monitoring needs. Memory 316 is controlled by a timing sequence which is generated by means of timing chain 318. Timing chain 318 is actuated by write logic 314, by generating a signal over line 315. The various timing signals generated by timing chain 318 are designated (a)–(e), and are typically associated with the read and write cycles of a high-speed memory of a type commercially available, to permit data to be stored or retrieved at approximately a 7–12 megahertz rate. Data samples may therefore be received over memory bus 311 by memory 316 at a maximum rate which is limited by the memory cycle, which in this case is approximately 12 megahertz. Likewise, data samples may be retrieved from memory 316 by output register 320, via memory bus 311, at data transfer rates of approximately 7 megahertz. However, in actual practice, the data transfer rate via output register 320 is limited by the data transfer rate of large store memory 28, which is considerably slower than 12 megahertz.

Write logic 314 receives a "sample ready" signal from channel interface 10 over line 234. Upon receipt of this signal write logic 314 generates a series of more or less simultaneous signals. A signal is generated over line 315 to activate timing chain 318; a signal is generated over line 317 to activate the write buffer 326, and a signal is sent over line 319 to deactivate read buffer 328; a signal is sent over line 321 to activate the cache memory 316; and a signal is sent over line 312 to condition sample register 310 for the receipt of data over data bus 15. A predetermined time later, which is sufficient for the capture of the data into sample register 310, write logic 314 sends a signal over "disable" signal line 236 to reset the latch flip-flop 232 in channel interface 10. The timing chain 318 generates a series of timing pulses (a)–(e) which are utilized to energize the necessary control signals to enable the transfer of data into cache memory 316.

Address control of memory 316 is maintained by write counter 330 during data transfer operations into memory 316. Write counter 330 is an incremental counter which has a total count capacity equal to the number of available addresses in memory 316, and each time a new data word is transferred into memory 316 a signal from timing chain 318 increments write counter 330 by one count. The count value in write counter 330 is transferred to write buffer 326 via lines 327, and write buffer 326 serves as the address register for memory 316 during a write operation.

During a read operation, when data is transferred from memory 316 into output register 320 the control of memory 316 addresses is maintained by read counter 340, which is also an incremental counter having a total count capacity equal to the number of available storage locations in memory 316. Read counter 340 transmits an address value via lines 329 to read buffer 328, and read buffer 328 serves as the address register for memory 316 during read operations, i.e., during operations when data is retrieved from memory 316 and transferred to output register 320. In the event of a timing conflict between a memory read and a memory write operation, the write operation will take priority, because a signal generated by write logic 314 via line 319 will disable read buffer 328 during a write operation, and further a signal from write logic 314 via line 313 causes read logic 338 to abort the read cycle.

Cache memory 16 is designed to receive data from channel interface 10 at random rates and in random burst quantities up to data rates of 12 megahertz. Cache memory 16 is also designed to transmit data to large store memory 28 via FIFO memory and control 24 during periods of inactivity in the write operation at data rates which are limited by the speed of the large store memory 28, which typically operates in the range of 2–3 megahertz. Because of the lack of synchronization between data arriving into cache memory 16 and data being transferred out of cache memory 16, the memory utilizes separate addressing registers for the write and read operations. Write counter 330 increments each time a new data word is loaded into memory 316, and read counter 340 is incremented each time a word is retrieved out of memory 316. Because of the disparity in data transfer rates it is typical that write counter 330 will advance more rapidly than read counter 340, and a mechanism is therefore needed to enable cache memory 16 to track the relative lag in data transfer rates out of memory 316 as opposed to the data transfer rates into memory 316. This is accomplished by compare logic 335. Compare logic 335 receives the count value input from write counter 330, and also receives the count value input from read counter 340. Whenever these counts are unequal compare logic 335 generates a signal on line 336 to enable read logic 338. This signal serves to indicate to read logic 338 that there is currently a continuing need to read data output from memory 316 in order to retrieve all the data that has previously been stored into memory 316. This signal causes read logic 338 to generate an output ready signal over line 322 to FIFO memory and control 24 to initiate the transfer of a further data word from memory 316 via output register 320 to FIFO 24.

There is one condition wherein compare logic 335 may detect a condition of equality between the contents of write counter 330 and read counter 340, wherein the contents of memory 316 have not been fully transferred to FIFO memory and control 24. That is the condition when a significant amount of data has been input into memory 316 without a concurrent output transfer, and write counter 330 has "lapped" read counter 340. This condition may occur, because both counters 330 and 340 are designed to return to zero, or "wrap-around", after their maximum count has been achieved, and in the case of write counter 330 this means that newly arrived data will be overwritten into memory 316 over old data previously stored in the memory. If a significant burst of input data is received without a concurrent output of this data it is possible that write counter 330 may wrap-around and actually increment to equal the current count in read counter 340. When a wraparound condition occurs write counter 330 generates a signal over line 331 to set a "wraparound" (w) flip-flop 342. This causes a blocking signal on line 332 which is fed to compare logic 335, and which inhibits compare logic 335 from generating an equality signal even though the contents of the write counter may equal the read counter. Whenever the read counter 340 reaches the maximum count value and wraps around to begin a new count it generates its signal over line 341 to reset wrap-around flip-flop 342. This signal removes the blocking signal on line 332 and enables compare logic 335 to generate the necessary equality signal on line 336 whenever the count values are equal. In this manner, cache memory 16 is continuously driven to unload its recently stored contents into output register 320, and to FIFO 24, to the full extent that memory 316 has been filled by the data flowing into sample register 310.

It should be noted that in the case of the write counter "lapping" the read counter, certain data previously stored in memory 316 will become lost to the system, because it will become overwritten by new data into memory 316 before read counter 340 has had a chance to access the old data and transfer it out of memory 316. In this situation, to avoid reading the new data read counter 340 is advanced along with write counter 330. Thus, when one or more write cycles occur under these conditions an equal number of sampled data words will be lost by overwriting and a gap of sampled information will exist between the last data word read from cache memory and the next data word read. In this case a flag is set to indicate to the operator via the display screen 36 that a gap in data retrieval has occurred. This flag will indicate to the operator that apparent inconsistencies in the data displayed are not caused by problems in the system being monitored, but rather by the overflow of data into cache memory 16.

In the preferred embodiment memory 316 has been constructed from the plurality of static random access memory chips organized as 1,024 words by 4-bits. A typical memory chip which is useful for this purpose is manufactured by INTEL, under type designation 2149H-3. This chip provides a memory selection access time of approximately 25 nanoseconds, with suitable data transfer rates for system operation. The timing chain 318 is constructed from a digital delay line circuit, such as a circuit manufactured by ESC Electronics Corporation, Palisades Park, New Jersey, under Model No. 14TD100. This circuit provides five different timing signals, with a 20 nanosecond delay between each of the five signals. The remaining registers, counters and logic elements which are combined to form cache memory 16 are all commercially available components available from a number of manufacturers.

FIFO and Control

Figure 4:
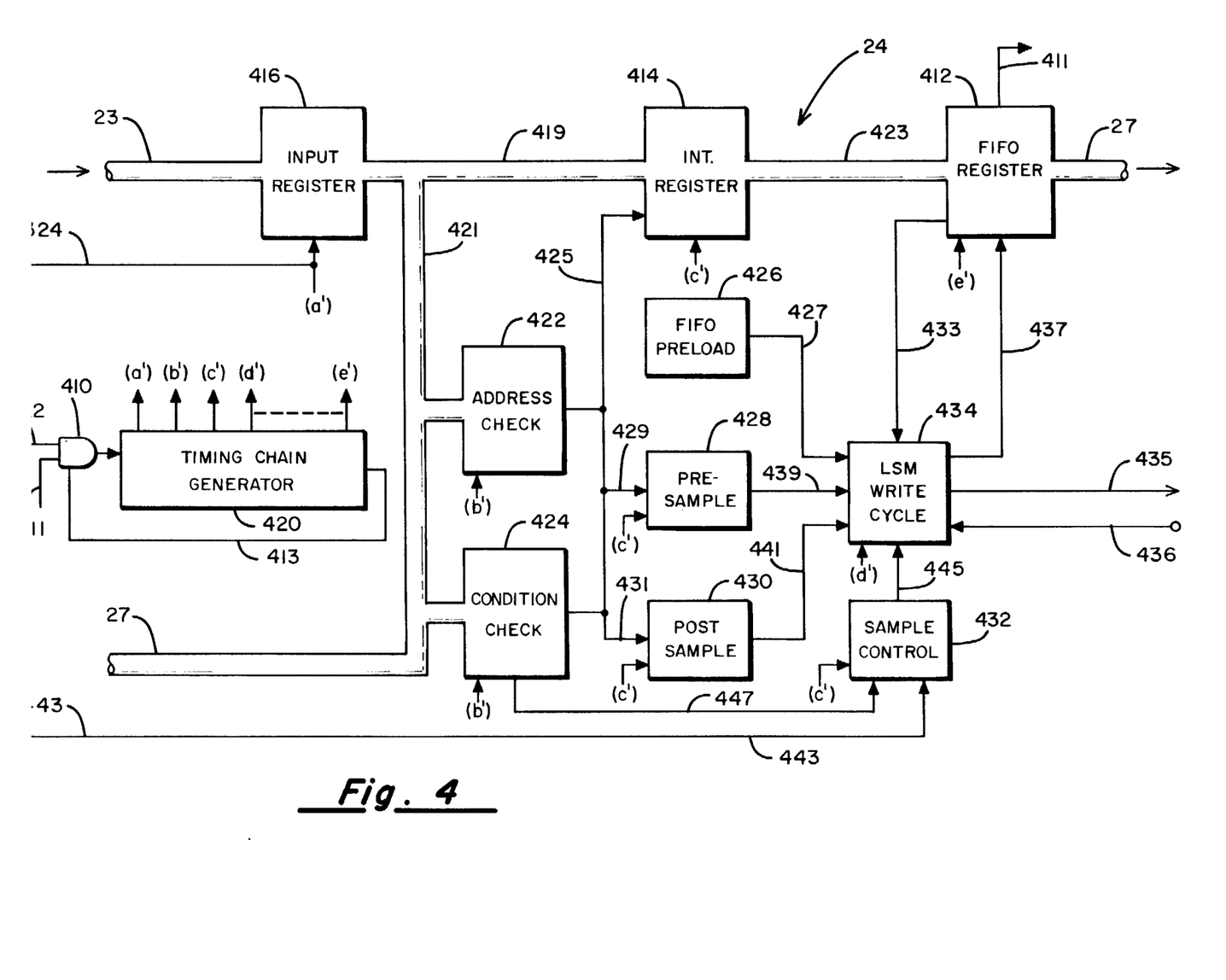
FIG. 4 shows a functional block diagram of the FIFO and control.

Referring next to FIG. 4 there is shown a functional block diagram of the FIFO and control logic 24. FIFO and control logic 24 is initially activated by a signal on cache ready signal line 322. This signal is combined in AND gate 410 with a signal on FIFO ready line 411, and a signal on line 413 which activates after a complete timing chain 420 cycle, to activate timing chain generator 420. The signal on line 411 is derived from FIFO register bank 412, and provides an indication that the FIFO registers are in condition to accept new information from cache memory.

Timing chain generator 420 generates a plurality of individual timing signals (a')–(e') which control the relative sequencing of transfers within FIFO and control 24. Timing chain generator 420 is a commercially available semiconductor element, such as one available from ESC Electronics Corporation under model designation 14TD200, which is capable of generating five timing signals at 40 nanosecond intervals. For convenience, each of the timing signals are illustrated in FIG. 4 in sequential order as (a')–(e'), and their respective inputs into the logic circuitry illustrated on FIG. 4 are similarly shown by the same designations.

Timing chain generator 420 generates a first timing signal (a') which is received by input register 416, causing input register 416 to receive the contents of cache memory output register 320, and also generates a signal over line 324 to cache memory read logic 338 to indicate a complete transfer, and thereby to enable another read cycle. The received contents of input register 416 are sensed by address check logic 422 and condition check logic 424 via data channel 421. Address check logic 422 also has a data input connection to data bus 27. Address check logic 422 is a 1-bit memory chip having 256 addressable locations. Each of these locations is addressable by a data word transmitted over data bus 27, or by a data word transmitted over data channel 421. The data word transmitted over data bus 27 is derived from computer 20, and is typically gated into address check logic 422 during the initial setup of the system to prepare it for monitoring. Each of the 256 memory locations is representative of a potential equipment address of interest, and during the initial setup of the system for monitoring computer 20 generates a signal over data bus 27 to store a "1" logic bit in each of the memory addresses in address check logic 422 which correspond to the equipment addresses to be monitored. Similarly, condition check logic 424 is accessible by external signals (not shown) to generate predetermined check conditions or error conditions which are to be examined during the monitoring process. At the time the contents of input register 416 are gated into address check logic 422 and condition check logic 424, both the address check logic 422 and the condition check logic 424 generate signals if the data includes address and condition information of the type which the system has been directed to monitor. Address check logic 422 and condition check logic 424 generate a 3-bit signal as a result of this check, and transmit this signal via lines 425 to intermediate register 414. This 3-bit information word is carried by intermediate register 414, which also receives the contents of input register 416 at the same time. The signals from address check logic 422 and condition check logic 424 are also transmitted to presample logic 428 via lines 429, and to postsample logic 430 via lines 431.

Intermediate register 414 receives the contents of input register 416 over data bus 419 at time (c'), together with the 3-bit data word over lines 425 from address check logic 422 and condition check logic 424. Intermediate register 414 transmits its entire contents via data bus 423 to FIFO register bank 412 at time (e'). FIFO register bank 412 consists of sixteen parallel shift registers, each of which have a capacity sufficient to hold the contents of intermediate register 414, including the 3-bit data word which also is held within intermediate register 414. The sixteen registers in FIFO register bank 412 include a first register connected to data bus 423 for receiving information from intermediate register 414, fourteen sequential shift registers for transferring the data in a step-by-step fashion throughout register bank 412, and a final output register which transmits the data via data bus 27 to large store memory 28. Alternatively, the contents of the output register of FIFO register bank 412 may be inhibited from transfer to large store memory 28, in which case the contents of the output register become lost. The decision as to whether the contents of the output register of FIFO register bank 412 are transmitted to large store memory 28 or are simply lost is made as a consequence of the contents of the 3-bit data word generated by address check logic 422 and condition check logic 424. Each time a new data word is received at the first input register of FIFO register bank 412 the contents of all the registers within the register bank are shifted to the adjacent register, and the output register is transmitted either to large store memory 28 or is simply overwritten and lost.

The initiation of a write cycle into large store memory 28 is controlled by LSM write cycle logic 434. Whenever a data word is to be written into large store memory 28 via FIFO register bank 412 LSM write cycle logic 434 generates a signal on line 435. This signal is transmitted to an address counter 518 in system controller 30 to cause large store memory 28 to initiate a write cycle and to transfer the data into storage. At the completion of the memory write cycle large store memory 28 generates a completion signal over line 436 to LSM write cycle logic 434. This signal indicates to LSM write cycle 434 that large store memory 28 is ready to receive a further word transfer.

Large store memory 28 is a commercially available product, as for example, Model PSM 512P, manufactured by Plessey Microsystems, Rockville, Maryland. Particular logic elements may readily be designed by those skilled in the art to provide the required signals for the proper operation of this memory.

LSM write cycle logic 434 is in turn controlled by signals from a number of sources. A first control signal is received over line 433 from FIFO register bank 412, which signal is dependent upon the contents of the 3-bit data word which was originated in address check logic 422 and condition check logic 424. If this 3-bit data word indicates that the contents of FIFO register bank 412 are to be transferred into large store memory 28, rather than lost, the signal on line 433 will become active, and will initiate an LSM write cycle signal over line 435. A second signal into LSM write cycle logic 434 is received via line 439 from presample logic 428. Presample logic 428 is activated whenever a determination is made by address check logic 422 and condition check logic 424 to save a monitored data word by storing it in large store memory 28, and presample logic 428 determines that a predetermined number of prior samples should also be saved. In the preferred embodiment, presample logic 428 is connected to save fifteen prior samples. These fifteen prior samples are retained in FIFO register bank 412 at the time the sample word of interest is first placed into FIFO register bank 412. Therefore, LSM write cycle 434 will become initiated by a signal on line 439 from presample logic 428 to cause fifteen prior samples to be written into large store memory 28 as a result of detecting a monitored data sample of interest.

Similarly, postsample logic 430 is constructed to cause LSM write cycle 434 to become activated for a predetermined number of postsamples, which occur after the data word sample of interest. In the preferred embodiment postsample logic 430 has been designed to provide fifteen postsamples, which causes LSM write cycle 434 to activate large store memory 28 for receiving fifteen additional words. Postsample logic 430 activates LSM write cycle logic 434 via line 441.

Sample control logic 432 provides further control over LSM write cycle logic 434 via line 445. Sample control logic 432 provides an overall control of the total number of samples to be taken after a designated error or other condition has been detected by condition check logic 424 and signaled to sample control logic 432 over line 447. Sample control logic 432 receives a signal from computer 20 via line 443, which signal designates the total number of samples to be taken after detecting the predetermined condition. The signal on line 443 is typically generated by computer 20 during the time when initial conditions are set into the system for the sampling operation.

Finally, FIFO preload logic 426 also controls LSM write cycle logic 434 via a signal transmitted over line 427. FIFO preload logic 426 serves to function only during the initial sampling sequences, wherein it causes FIFO register bank 412 to become loaded with fifteen samples in order to set up the FIFO register bank 412 for subsequent operation. The gating of the respective data words through FIFO register bank 412 is controlled by a signal from LSM write cycle logic 434 over line 437. This signal controls the shifting between intermediate register stages within FIFO register bank 412.

In summary, FIFO memory and control 24 operates to receive data samples from cache memory 16. Each of these data samples are examined to determine whether they contain information to be retained in large store memory 28, or whether they may simply be discarded as not containing information of interest. Once a determination is made that a sample should be saved the control logic within FIFO memory and control 24 controls large store memory 28 to not only save the data sample of interest, but also to save the fifteen previous data samples and the fifteen subsequent data samples. The signal timing conditions required for the transfer of data within FIFO memory and control 24 are generated by a timing chain generator 420, and the overall data transfer rates of FIFO memory and control 24 are determined by the speed of the memory cycle for large store memory 28, if the data is to be saved, and by the cycle time of timing chain generator 420 if the data is to be discarded.

All of the registers and logic elements shown in FIG. 4, in connection with FIFO and control 24, are standard commercially available components. The logic functions described above may be readily incorporated by those skilled in the art from combinations of these commercially available components.

System Controller

Figure 5:
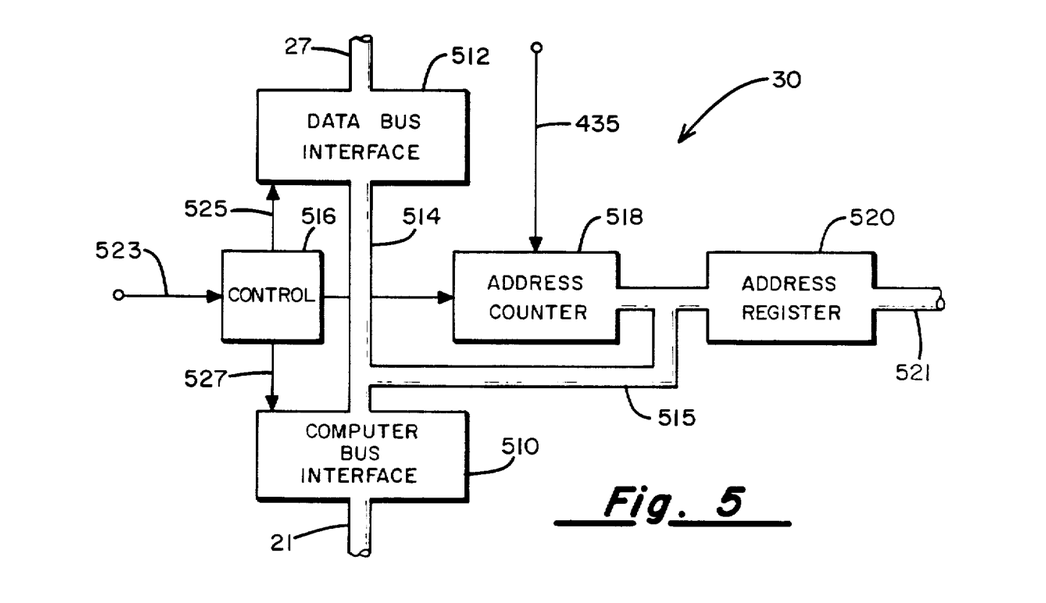
FIG. 5 shows a functional block diagram of the system controller.

System controller 30 is illustrated in functional block diagram form in FIG. 5. The components utilized in system controller 30 are commercially available semiconductor components, including registers, counters and logic elements. System controller 30 has an interface adapted for connection to computer bus 21, and for receiving computer data and control signals from computer 20. Likewise, system controller 30 has an interface adapted for connection to data bus 27, for transmitting signals to channel interface 10 and FIFO 24. Computer bus interface 510 is connected via an internal data path 514 to data bus interface 512. Computer bus interface 510 is also connected via an internal data path 515 to an address register 520. Address register 520 is in turn connected to large store memory 28 via address bus 521. An address counter 518 is also connected to address register 520. Address counter 518 has a count capacity sufficient to address all of the memory locations in large store memory 28, and the count value in address counter 518 is incrementally advanced by a signal on LSM write cycle line 435.

Control logic 516 generates control signals over lines 525 and 527 for controlling the data transfer capabilities of data bus interface 512 and computer bus interface 510. Control logic 516 in turn is driven by control signals over lines 523, which are derived from computer 20.

System controller 30 is in large part an internal switching network which is controllable by computer 20 to provide data channel signal paths for the several modes of possible operation of the system. For example, computer 20 may generate control signals over lines 523 to cause control logic 516 to link the data bus interface 512 directly to the computer bus interface 510. In this mode, computer 20 becomes directly coupled for data transfer to either the channel interface 10 or the FIFO 24. As a further example, computer 20 may generate control signals over lines 523 to control logic 516 to cause computer 20 to directly interact with large store memory 28. In this mode, computer bus interface 510 is linked via internal data path 515 directly to large store memory address register 520. Computer 20 can then generate an address to large store memory 28 via address bus 521. As data is retrieved from large store memory 28 over data bus 27, data bus interface 27 causes this data to be transferred directly to computer bus interface 510, and thereafter to computer 20 via computer bus 21. As a further example, computer 20 may generate control signals over lines 523 to cause control logic 516 to generate control signals to permit data bus interface 27 and address counter 518 to control the operation of large store memory 28. In this mode, large store memory 28 is adapted to receive data from FIFO 24, in consecutive memory locations which are determined by address counter 518, address counter 518 being incrementally advanced by LSM write cycle signals present on line 435.

Signals generated by computer 20 over lines 523 may also cause control logic 516 to release data bus 27 so that a tape control unit (not shown) can exercise control of data bus 27 to effect a direct large store memory to tape unit transfer.

Computer

Computer 20 may be selected from a number of commercially available computers, and in the preferred embodiment a Model MC85 Single Board Computer available from Comark Corporation, Medfield, Massachusetts, has been selected. This computer has an internal random access memory, with a memory expansion capability to enable it to store up to 20,000 bytes of information in 8-bit words. The computer has 48 programmable parallel input/output (I/O) lines, programmable priority interrupts, programmable interval timers and an internal controller for operating display 36. The computer is designed to operate at a system clock time of 5 megahertz, and it has a 16-bit address bus which allows it to directly address up to 64,000 bytes of memory. The computer is fully described in a booklet published by Comark Corporation entitled "Users Manual", and is published under Document No. D-05-00780-001, Revision B.

Channel Monitoring

While the invention may be utilized for monitoring signals in computer systems and digital communication systems of a wide variety of types, the preferred embodiment is best understood in connection with the communications conventions adopted by International Business Machines (IBM). In particular, the IBM System/360 and System/370 input/output interface channel conventions are widely known in the art, and is described in IBM Publication GA22-6974-7, and reference will be made herein to these conventions in connection with the operation of the invention.

Figure 6:
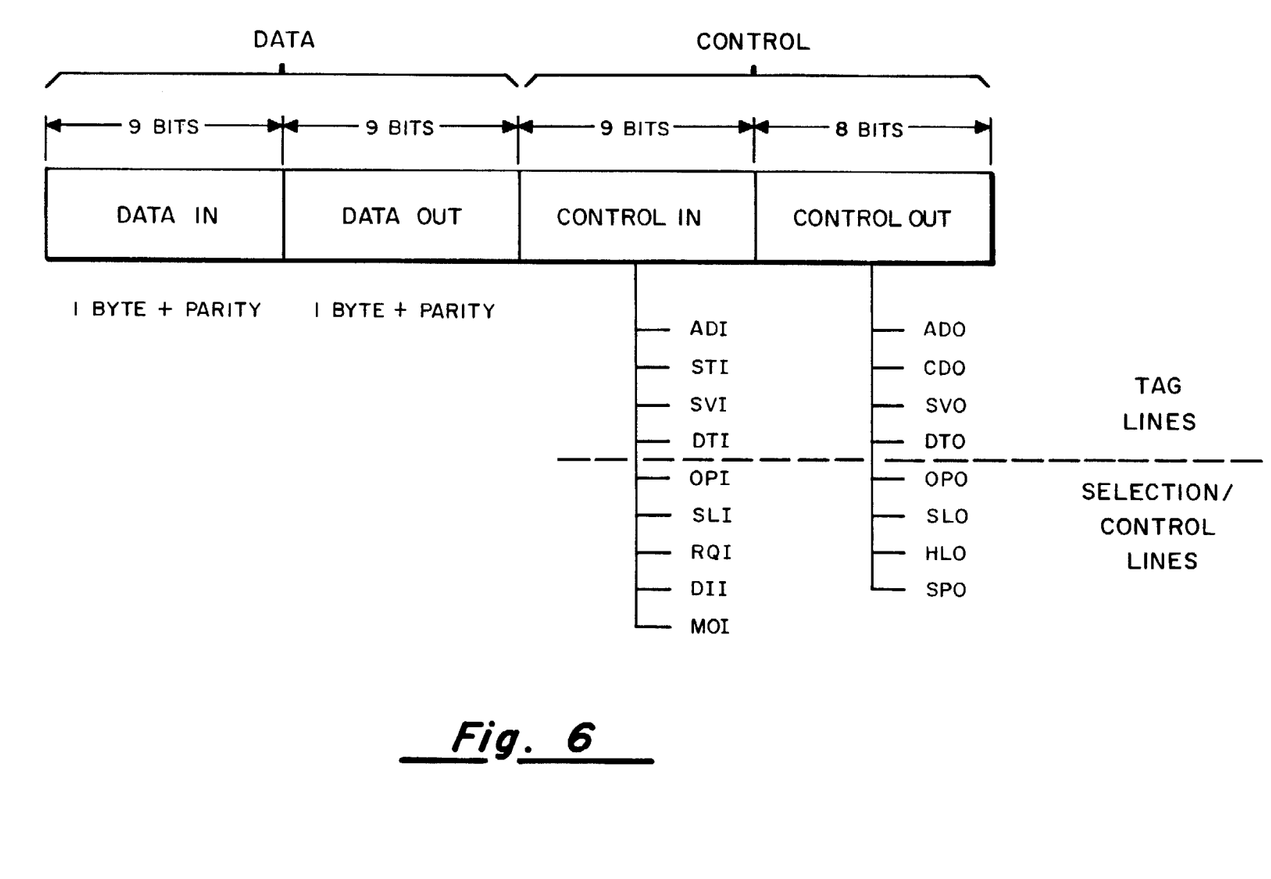
FIG. 6 shows a diagram of a typical data channel word.

FIG. 6 shows a diagram of the input/output (I/O) lines in a conventional interface channel for connecting control units to a computer channel. The channel typically utilizes a total of 35-bits, divided into an 18-bit segment associated with data transmitted over the channel, and a 17-bit segment associated with control information relating to the data. The data segment of the channel word is further subdivided into a 9-bit segment associated with input data to the computer, comprising one data byte plus a parity bit, and a 9-bit segment associated with output data from the computer, comprising a data byte plus a parity bit. The control segment is further subdivided into an 8-bit input control segment and a 9-bit output control segment.

The data input lines are used to transmit information, including actual data, selected I/O-device addresses, status information, and sense information from a control unit to the channel. The output data lines are used to transmit data, I/O-device address information, commands, and control information from the channel to the control unit. The control segment of the 35-bit word may be further subdivided and defined as containing four input control and four output control "tag" lines, which are used for interlocking and controlling information on the channel and for special sequences. The control segment of the 35-bit word may be further described in terms of five input and four output selection/control lines, which are used for scanning or selection of attached I/O devices, and for providing special control conditions. These subdivisions are illustrated in FIG. 6.

The control segment of the interface channel lines are conveniently referred to in mnemonic form, which are described below:

| ADI | ADDRESS IN | ADO | ADDRESS OUT |
|-----|------------|-----|-------------|
| STI | STATUS IN | CDO | COMMAND OUT |
| SVI | SERVICE IN | SVO | SERVICE OUT |
| DTI | DATA IN | DTO | DATA OUT |
| OPI | OPERATIONAL IN | OPO | OPERATIONAL OUT |
| SLI | SELECT IN | SLO | SELECT OUT |
| RQI | REQUEST IN | HLO | HOLD OUT |
| DII | DISCONNECT IN | SPO | SUPRESS OUT |
| MOI | MARK ZERO IN | | |

Each of the foregoing mneumonic signal descriptors has a well-defined meaning and use in connection with information control and transfer in computer interface channels. The present invention may be connected to each of the foregoing lines through input lines 12 which terminate at channel interface 10.

The preferred embodiment of the present invention also provides ten additional input lines 14 which may be selectively connected to other equipment signal points of interest to enable the operator to utilize these additional lines to control or predetermine the selection of sample data of interest. In any event, once the predetermined conditions for sampling have been met the entire set of signals represented by FIG. 6 will be received by channel interface 10 in the form of forty-five discrete signals, and will be transferred through the cache memory 16 and FIFO 24 for ultimate storage in large store memory 28. The information may subsequently be retrieved from large store memory 28 by means of transfers controlled by computer 20, and the information may be organized by computer 20 for meaningful presentation to an operator on display 36, in a manner to be hereinafter described. Although many forms of visualization of the information are possible, it is a novel feature and advantage of the present invention to provide a preferred form of visualization to enable an operator to quickly and conveniently analyze the activities being monitored.

System Operation-Initialization

The operation of the invention is controlled primarily through the software programs which are prestored in computer 20, which are organized into functional groupings according to several different operational sequences. The programs are adapted to utilize the visual display 36 to interact with an operator, and a keyboard 22 to receive overall system direction and control from an operator. A first functional group of operating programs is related to the setting up of the necessary sampling conditions prior to beginning an actual sampling run. In this regard, the operator may utilize keyboard 22 to key the addresses of interest into computer 20. The addresses of interest are designated by equipment address quantities associated with the equipment being monitored, to cause the system to sample information associated with this equipment if its address is designated. Further, the operator may designate via keyboard 22 specific signal lines of interest, and may cause the system to begin sampling whenever the designated signal lines change signal state from high to low or vice versa. Signal lines of interest may include control lines between equipment of interest being monitored, which indicate that a particular piece of equipment is being activated or deactivated, or may include particular channel data lines of interest. Further, the operator may designate via keyboard 22 the start and stop conditions for a sampling run, such as starting the sampling run upon the happening of the activation of certain signal lines, or stopping a sampling run upon the collection of a designated number of samples.

System Operation—Sample Execution

The operator may designate via keyboard 22 the condition or conditions upon which a sampling run is to be executed. These conditions may be made dependent upon the happening of an external signal condition, or upon the activation of a particular key on keyboard 22. After a sampling run has been executed it will continue until the designated stop conditions have occurred, or alternatively the operator may manually stop a sampling run via a command entered over keyboard 22.

During the time that a sampling run is being executed the channel interface continually monitors the signals to which it is connected, and periodically receives and transmits signal information of interest into cache memory 16. Cache memory 16 in turn forwards the signal information of interest into FIFO 24, and FIFO 24 under the control of system controller 30 transfers the information into large store memory 28. At the completion of a sampling run large store memory 28 will retain all of the collected samples, stored in successive memory locations, including information relating to the origin of the samples and the conditions of various signal lines which cause the sample to be taken. In addition, large store memory 28 will retain information sampled on the signal lines of interest prior to the occurrence of the event of interest, and samples of the signal lines subsequent to the occurrence of the signal of interest. This provides information relating to the conditions which existed in the system just prior to the occurrence of the signal of interest, and information on the conditions that existed within the system just after the sampling segment has ended.

System Operation—Results

At the completion of a sampling run it is typical that large store memory 28 has collected and retained a very significant volume of information and data, which information and data has been sequentially stored in successive memory locations. Because of the high data collection rates and the very large volume of data which is collected it is difficult to meaningfully analyze the data stored in large store memory 28 as a result of a sampling run. One of the novel features of the present invention enables the system to organize and present the data to the operator in a fashion which enables the operator to quickly scan the sampled data, and which directs the operator's attention to signal changes which caused events of interest to occur. This operator interaction is facilitated by computer 20 and display 36, operating in conjunction with large store memory 28. The information displayed on display 36 provides an indication of the changes which occurred from one sample to the next, in addition to an indication of conditions which existed at the time the sample was taken.

The information stored in large store memory 28 includes a binary representation of the data and control bits for each channel word as illustrated in FIG. 6. Each word is stored in the same sequence and order as it was received by channel interface 10, and may therefore be retrieved for presentation to an operator in the same order as it was received. Since the channel data is organized into segments as shown in FIG. 6, it may be presented to an operator on a CRT screen in tabular form, under column headings identifying the same segments. The tabular presentation of the individual segments of data may be made in the identical binary form in which it is found in large store memory 28, or in some other form which is more conveniently read and understood by an operator. For example, the "data in" and "data out" segments may be presented on CRT display 36 as decimal numeral representations of the actual data stored in large store memory 28, or as alphabetic representations thereof, or as hexadecimal representations, or in any other convenient form which is readily understandable by the operator. Similarly, the information represented in the control segment of each word stored in large store memory 28 may be displayed on visual display screen 36 under columnar headings identifying the information as either "Control In" or "Control Out" information. The information may be represented in any convenient form readily understandable by the operator, such as the mneumonic form illustrated in FIG. 6, or in any other convenient representation.

The data stored in large store memory 28 was initially caused to be sampled and saved as a result of signal changes on one or more of the input lines 12 and 14 which are coupled to channel interface 10. Therefore, each word stored in large store memory 28 will have at least 1-bit which is different from the word stored in the preceding memory address, and which is different from the word stored in the next subsequent memory address. These differences in bit configurations represent the signals which were monitored and which initiated the actions causing the information to be collected and stored in large store memory 28. An exception to this rule may be found in connection with the fifteen samples which are inherently captured by the system immediately preceding the sample point of interest and immediately succeeding the previous sample point of interest, for these presample and postsample words may or may not be time-consecutive samples.

Figure 7:
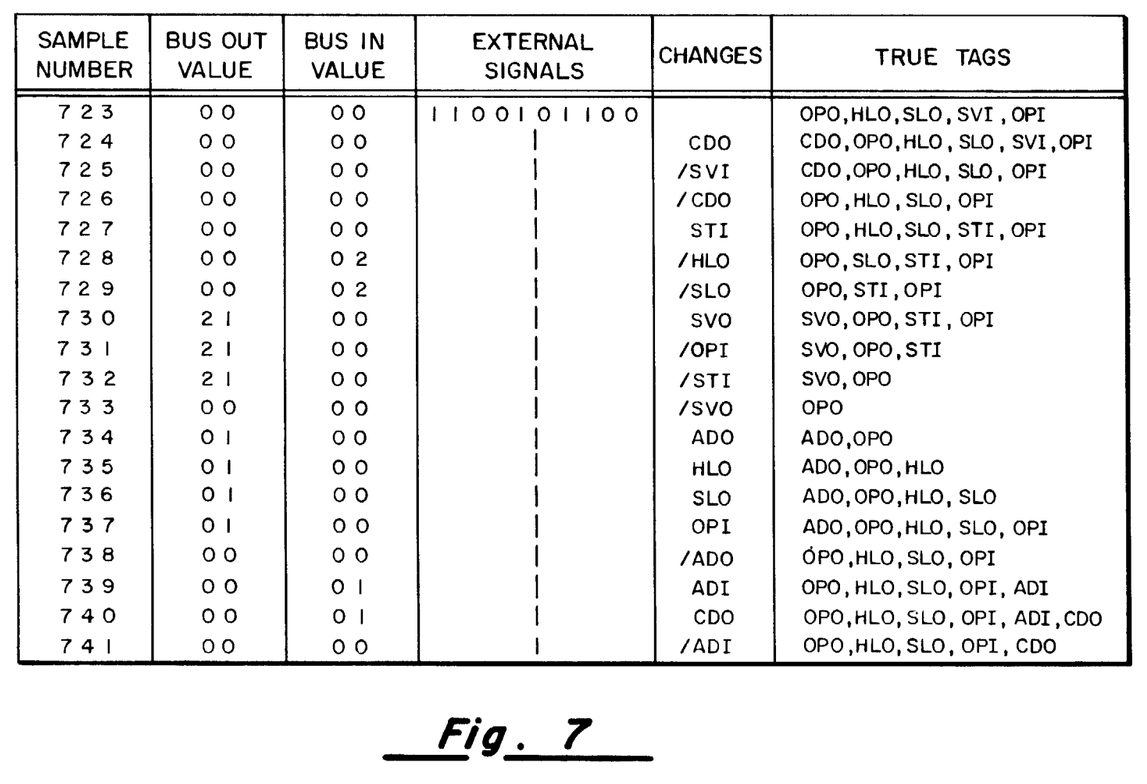
FIG. 7 shows a preferred form of visualization of the results of a monitoring operation.

When the system operation is placed in the analysis and results mode computer 20 becomes operational to retrieve subsequent memory addresses from large store memory 28, transfer the retrieved information into computer 20 for postprocessing operations, if any, and display the results on display screen 36. A preferred form of visualization of the results is illustrated in FIG. 7, which is representative of a typical display screen organized according to the teachings of the invention. This form of organization has the advantage of presenting to the operator a complete representation of each of the collected samples, and in addition presenting to the operator a display of the signal change which caused the sample to be taken. The tabular information presented under the heading "Sample Number" is merely a numerical sequential value representative of the order in which the samples were taken, corresponding to the relative addresses in large store memory from which the samples were retrieved. Alternatively, the column entitled "Sample No." could be designated as "Sample Interval", and the tabular results in the column could be a time representation of the time interval between a given sample and the next previous sample. The column in FIG. 7 entitled "Bus Out Value" presents a representation of the "Data Out" segment of the words shown in FIG. 6, in a form which is understandable to the operator. In the illustration presented in FIG. 7 the "Bus Out Value" is illustratively shown as two numerical digits indicative of data values. Similarly, the column entitled "Bus In Value" is representative of the data segment of FIG. 6 entitled "Data In".

The column entitled "External Signals" is a tabular representation of the consecutive states of the respective external signal lines 14, displayed in a form which is convenient and understandable to the operator. For purposes of illustration these signal values are shown in FIG. 7 in binary form, although other forms are also appropriately available. The column in FIG. 7 entitled "Changes" shows a sequential tabulation of each of the signal changes which occurred from one sample to the next, and therefore provide a visualization to the operator of the signal conditions within the equipment being monitored which caused the sample to be taken. By sequentially examining the data tabulated in this column the operator can determine the precise sequence of signals which governed the operation of the system being monitored. The column entitled "True Tags" in FIG. 7 provides a representation of the control bit information which is found in the control segment of the channel word illustrated in FIG. 6. For convenience, the visualization shown in FIG. 7 illustrates only those tags which were present on the monitored signal lines at the time the sample was taken, thereby indicating the active signal tags at the time the sample was taken. It should be noted that the column entitled "Changes" illustrates all changes which occurred from one sample to the next, including conditions where signals were applied to the lines as well as conditions where signals were deleted from the lines. The representation provided for signals that are removed from a signal line is to show the signal representation with a slash (/) immediately preceding the signal representation. For example, sample no. 725 shows that the change which occurred was /svi, indicating that the "service in" signal was removed from the signal lines, and that this removed signal caused the sample to be taken. If an operator understands the operating protocol of the equipment being monitored, it is readily apparent from an inspection of the tabular information under the column "Changes" to quickly verify whether the protocol is operationally correct, and if protocol errors are present in the system this inspection will quickly reveal the source of such errors.

In another form of visualization of the results of a sampling operation, the contents of large store memory 28 may be sequentially displayed only in respect of the changes which have occurred from sample to sample, with or without the corresponding data values in existence at each sample time, to provide a simple and rapid examination of all of the sequential signal changes which have occurred during the sampling interval. This form of visualization enables the operator to quickly examine all of the changes which have occurred during the sampling mode, and can enable an operator to check for a known or expected signal change.

In yet another form of visualization of the results of sampling, a real time clock may be connected to one of the input lines 14 to provide a regular and systematic clocking scheme for regulating the sampling intervals. This visualization may enable the operator to obtain statistical information relating to the relative usage of the lines being monitored, for obtaining samples as a function of time rather than as a function of other signal changes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A system for monitoring digital communication lines and for detecting predetermined signals transmitted over the digital communication lines and for recording such signals and organizing groups of such signals into a systematic presentment form and displaying the presentment form for viewing by an operator, comprising
  (a) a plurality of channel interface circuits, each circuit having an input means for electrical coupling to a digital communication line, and means, connected to said input means, for detecting signal and voltage transitions, output means, connected to said means for detecting signal and voltage transitions, for generating an output signal;
  (b) a cache memory having an input register connected to all of said channel interface circuit output means, and having an addressable memory coupled to said input register for receiving and storing data received therefrom, and having an output register coupled to said addressable memory for receiving stored data therefrom;
  (c) a first-in, first-out (FIFO) register bank having a first register coupled to said cache memory output register, and having a plurality of further registers coupled in sequential transfer operation to said first register and having an output register coupled to the last of said further registers to receive a last sequential transfer of data first received by said first register;
  (d) an addressable large store memory coupled to said FIFO output register, including means for storing in sequential addresses data received from said FIFO output register;
  (e) a programmable digital computer coupled to said large store memory, said computer having means for addressing said large store memory and for transferring data from said large store memory to said computer, and said compartment having means for systematically organizing said data into a presentment form wherein said signal voltage transitions are explicitly identified; and (f) a visual display device connected to said digital computer, including means for receiving said systematically organized data, means for displaying said data presentment form, and means for displaying said explicitly identified voltage transitions.

2. The system of claim 1, wherein said cache memory further comprises a first activation circuit coupled to said pluralilty of channel interface circuits, said circuit having means for generating a first activation signal in response to said interface circuits output signals; an incremental write counter coupled to receive said first activation signal, including means for generating an incrementally increased write count output value; and an addressing means coupled to receive said write count output value and for addressing said addressable memory in response thereto.

3. The system of claim 2, wherein said cache memory further comprises a second activation circuit having an input signal line, said second activation circuit having means for generating a second activation signal in response to a received signal on said input signal line; an incremental read counter coupled to receive said second activation signal, including means for generating an incrementally increased read count output value; and an addressing means coupled to receive said read count output value and for addressing said addressable memory in response thereto.

4. The system of claim 3, wherein said cache memory further comprises means for comparing said write count output value and said read count output value, and for generating a signal to said second activation circuit input signal line when said count values are unequal.

5. The system of claim 4, wherein said write counter and said read counter respectively have means for presetting a predetermined maximum count value and means for returning to a zero count value after said maximum count value has been achieved, and wherein said cache memory further comprises means for detecting a signal from the respective said means for incrementally returning to a zero count value to respectively generate a wraparound signal in response thereto.

6. The system of claim 5, wherein said cache memory further comprises means for receiving and for detecting the write counter wraparound signal and means for receiving and for detecting the read counter wraparound signal, and including means for incrementing the count value in said read counter in time coincidence with said write counter whenever a write counter wraparound signal is detected without the corresponding detection of a read counter wraparound signal.

7. The system of claim 6, wherein said cache memory further comprises means connected to said second activation circuit for blocking said second activation signal when said second activation signal appears in time coincidence with said first activation signal.

8. The system of claim 3, wherein said cache memory further comprises an output ready signal line connected to said second activation circuit means for generating a second activation signal, and wherein said FIFO register bank further comprises means for gating data from said cache memory output register into said first register, coupled to said output ready signal line.

9. The system of claim 8, wherein said cache memory further comprises means for comparing said write count output value and said read count output value, and for generating a signal to said second activation circuit input signal line when said count values are unequal.

10. The system of claim 9, wherein said write counter and said read counter respectively have means for presetting a predetermined maximum count value and means for returning to a zero count value after said maximum count value has been achieved, and wherein said cache memory further comprises means for detecting a signal from said means for returning to a zero count value to respectively generate a wraparound signal in response thereto.

11. The system of claim 10, wherein said cache memory further comprises means for receiving and for detecting the write counter wraparound signal and means for receiving and for detecting the read counter wraparound signal, and including means for incrementing the count value in said read counter in time coincidence with said write counter whenever a write counter wraparound signal is detected without the corresponding detection of a read counter wraparound signal.

12. The system of claim 11, wherein said cache memory further comprises means connected to said second activation circuit for blocking said second activation signal when said second activation signal appears in time coincidence with said first activation signal.

13. The system of claim 8, wherein said FIFO register bank further comprises means connected to said FIFO first register for detecting and identifying predetermined signals representative of data stored in said FIFO first register, and means for generating signals representative of an additional data segment responsive to said identified predetermined signals, and means for transferring said signals representative of an additional data segment into the next subsequent register of said plurality of further registers together with the data signals stored in said first register, and means for transferring said signals representative of an additional data segment and said data signals from the next subsequent register to the plurality of further registers and to the output register, sequentially.

14. The system of claim 13, wherein said FIFO register bank further comprises means, connected to one of said registers, for decoding said signals representative of an additional data segment, including means for generating an output decoding signal when predetermined signal combinations are present, and means, responsive to said output decoding signal for enabling and disabling signal transfers between said output register and large store memory.

15. The system of claim 14, wherein said FIFO register bank further comprises presample storage means coupled to said means for decoding said signals representative of an additional data segment and coupled to said means for enabling signal transfers between said output register and said large store memory, said presample storage means having means for enabling further signal transfers between said output register and said large store memory of a predetermined number of sequential signal transfers prior to the transfer of said decoded data segment signals and said associated data signals.

16. The system of claim 15, wherein said FIFO register bank further comprises post sample storage means coupled to said means for decoding said signals representative of an additional data segment and coupled to said means for enabling signal transfers between said output register and said large store memory, said post sample storage means having means for enabling further signal transfers between said output register and said large store memory of a predetermined number of sequential signal transfers after the transfer of said decoded data segment signals and said associated data signals.

17. The system of claim 1, wherein each channel interface circuit further comprises an input line adapted for connection to a digital communication line; a time-delay signal inversion circuit having an input coupled to said input line and an output; a logical OR gate and a logical NAND gate, each having two inputs respectively connected in parallel to said input line and said time-delay signal inversion circuit output, each of said OR gate and said NAND gate having an output; and a further NAND gate having two inputs respectively connected to said OR gate output and said NAND gate output, said further NAND gate having an output.

* * * * *